US008849719B2

(12) United States Patent
Baker (10) Patent No.: US 8,849,719 B2
(45) Date of Patent: Sep. 30, 2014

(54) PROVIDING CONTENT TO A PORTABLE PLAYBACK DEVICE (76) Inventor: Christopher W. Baker, South Jordan, UT (US)

( * ) Notice: Subject to any disclaimer, the term of this patent is extended or adjusted under 35 U.S.C. 154(b) by 815 days.

(21) Appl. No.: 11/832,035

(22) Filed: Aug. 1, 2007

(65) Prior Publication Data

US 2008/0034126 A1 Feb. 7, 2008

Related U.S. Application Data (60) Provisional application No. 60/821,197, filed on Aug. 2, 2006, provisional application No. 60/826,861, filed on Sep. 25, 2006.

(51) Int. Cl.
*G06F 21/00* (2013.01)
*H04N 7/16* (2011.01)
*G11B 27/10* (2006.01)

(52) U.S. Cl.
CPC .................................. *G11B 27/105* (2013.01)
USPC .................................. 705/59; 705/52; 726/27

(58) Field of Classification Search
USPC ........................................................ 705/1–79
See application file for complete search history.

(56) References Cited

U.S. PATENT DOCUMENTS

| | | | | |
|---|---|---|---|---|
| 4,907,268 A | * | 3/1990 | Bosen et al. | 713/193 |
| 5,060,263 A | * | 10/1991 | Bosen et al. | 713/184 |
| 5,495,411 A | * | 2/1996 | Ananda | 705/32 |
| 5,548,645 A | * | 8/1996 | Ananda | 705/52 |
| 5,914,941 A | * | 6/1999 | Janky | 370/313 |
| 5,961,601 A | * | 10/1999 | Iyengar | 709/229 |
| 6,151,591 A | * | 11/2000 | Pierce et al. | 705/401 |
| 6,170,060 B1 | * | 1/2001 | Mott et al. | 726/29 |
| 6,226,618 B1 | * | 5/2001 | Downs et al. | 705/51 |
| 6,233,565 B1 | * | 5/2001 | Lewis et al. | 705/35 |
| 6,466,921 B1 | * | 10/2002 | Cordery et al. | 705/60 |
| 6,560,651 B2 | | 5/2003 | Katz | |
| 6,697,944 B1 | * | 2/2004 | Jones et al. | 713/168 |
| 6,862,460 B2 | * | 3/2005 | Safadi | 455/553.1 |
| 6,974,076 B1 | * | 12/2005 | Siegel | 235/380 |
| 2002/0010681 A1 | | 1/2002 | Hillegass | |
| 2006/0287110 A1 | * | 12/2006 | Klitsner et al. | 463/44 |
| 2007/0168540 A1 | * | 7/2007 | Hansson | 709/231 |
| 2007/0174919 A1 | * | 7/2007 | Raines et al. | 726/27 |
| 2007/0250193 A1 | * | 10/2007 | Raines et al. | 700/94 |

(Continued)

OTHER PUBLICATIONS

"Music labels trying new format: SanDisk's slotMusic mini flash memory cards," by Michell Quinn, Los Angeles Times, Sep. 22, 2008, 3 pgs. [online] [retreived on Oct. 2, 2008]. Retrieved from the Internet: http://www.latimes.com/business/la-fi-sandisk22-2008sep22,0,4166641.story.

"SM slotMusic website," Sep. 22, 2008, 1 pg. [online] [retreived on Oct. 2, 2008]. Retrieved from the Internet: http://www.slotmusic.org/.

(Continued)

*Primary Examiner* — Evens J Augustin
(74) *Attorney, Agent, or Firm* — Workman Nydegger (57) ABSTRACT

One or more storage modules in accordance with implementations of the present invention can be configured for a direct physical connection to a portable, digital playback device. The one or more storage modules comprise computer-executable instructions and one or more media files for delivering content directly to the portable playback device. Thus, for example, a potential customer or end user can plug-in a purchased or rented storage module directly into a personal digital playback device and watch movies, listen to music, watch/listen to news programs, or the like without necessarily having to download content through an intermediate computer system or network interface.

19 Claims, 6 Drawing Sheets

(56) References Cited

U.S. PATENT DOCUMENTS

| | | | |
|---|---|---|---|
| 2007/0288715 A1* | 12/2007 | Boswell et al. | 711/164 |
| 2008/0212422 A1* | 9/2008 | Brondijk et al. | 369/47.13 |
| 2009/0007198 A1* | 1/2009 | Lavender et al. | 725/91 |
| 2009/0034939 A1* | 2/2009 | Okada et al. | 386/126 |
| 2009/0150697 A1* | 6/2009 | Yang | 713/323 |
| 2009/0162033 A1* | 6/2009 | Del Sordo et al. | 386/124 |

OTHER PUBLICATIONS

"Sanity unveils digital music kiosks," by Randolph Ramsay, Copyright 2008, CNET Networks, Inc., 2 pgs. [online] [retreived on Jul. 29, 2008]. Retrieved from the Internet: http://www.cnet.com.au/mp3players/musicsoftware/0,239029154,240060377,00.htm.

International Search Report for PCT/US07/75102 completed May 28, 2008.

* cited by examiner

PROVIDING CONTENT TO A PORTABLE PLAYBACK DEVICE

CROSS-REFERENCE TO RELATED APPLICATIONS

The present invention claims the benefit of priority to U.S. Provisional Patent Application No. 60/821,197, filed on Aug. 2, 2006, entitled "Providing Marketing Content to a Portable Playback Device," and to U.S. Provisional Patent Application No. 60/826,861, filed on Sep. 25, 2006, entitled "Providing Content to a Portable Playback Device." The entire contents of the aforementioned patent applications are incorporated herein by reference.

BACKGROUND

Background and Relevant Art

The advent of digital media has continually changed the types of content available to users, as well as the modes of delivering that content to users. For example, music, movies, and books, previously provided through vinyl, magnetic tape, or simple paper hardcopy, are now routinely compressed into digital form and provided to users using any number or type of digital playback devices (e.g., CD players, DVD players, MP3 players, IPOD media players, etc.) Users can then enjoy the digital content and portions thereof on a highly granular basis (i.e., specific seconds or minutes of a song or movie, specific chapter of a book) using a digital playback device (both portable or stationary).

One known advantage of digital media is that users can quickly and efficiently bypass undesired digital content in favor primarily (or exclusively) of favorable digital content. For example, in television systems, users often use digital playback devices (e.g., digital set top boxes) to record television programs, and, during playback, avoid commercials. In portable, music-based digital playback devices, users can easily find and select songs of interest as part of a play list, and, in some types of devices, even remove unwanted songs immediately from the play list and/or playback device.

One can appreciate, therefore, that such conveniences for users can provide significant challenges not only to content providers, but also to product manufacturers seeking to advertise content. In particular, content providers increasingly need to find ways not only to digitize content (particularly with media not already formatted this way), but also to provide digitized content in an efficient and useful way so that users will still desire to purchase and enjoy the content. Such challenges can be even more pronounced with product manufacturers who might have increasing difficulty providing advertising content to consumers.

As such, simply providing digital content to users via a digitized storage device (e.g., CDROM, DVD, etc.) may not be enough in light of recent technical developments. In particular, many portable digital playback devices now exclusively receive content via file transfer, rather than by reading a storage device (e.g., portable DVD player or CD player). This means that a user might first need to copy files from a DVD or CDROM to a personal computer, or alternatively download certain content to the personal computer from an online media store. If portability is desired, the user can then transfer the copied or downloaded files from the personal computer to the user's portable digital playback device. When away from the personal computer, the user may even be able to receive/download such content directly to the portable digital playback device through a wireless network connection.

One can appreciate, therefore, that although there may be no limit to what digital content a user can access, there may be a size limit to what the ultimate end-use device can handle, as well as a size limit based on the type of network connection. For example, movies, audio books, and certain enhanced media content can be quite large, even after the corresponding digital files have been compressed. By contrast, portable digital devices traditionally have smaller storage capabilities, and may have difficult storing or receiving such large files. Although it is more common now for portable digital devices to be able to store such large files, receiving such files remains a challenge. For example, direct file transfers often mean that a user needs to be connected to a home-based personal computer, or otherwise use whatever wireless network is available, in order to receive the files.

Unfortunately, wireless networks tend to have much lower bandwidth and reliability than network cable-connected systems (e.g., personal computers), and can result in very long download times for certain large files. As a result, users tend to download relatively large files such as movies and audio books initially to a personal computer or television set-top box through a broadband internet or satellite-based transmission. Furthermore, users tend to use portable digital devices for direct downloads over wireless networks primarily with smaller music files.

Of course, content providers would prefer the ability to provide any type of content directly to any type of digital device with relative immediacy. This is particularly true of large or enriched media content, which may be limited to physical network connection (i.e., cable-connected) downloads. For example, a user of a portable digital device may desire to download a movie to a portable, video-enabled device while waiting at an airport terminal. Unfortunately, providing enhanced digital content such as a movie may take longer than 1-2 hours even using a conventional physical network connection, and potentially much longer using a wireless network connection.

Along these lines, there is little guarantee that the user would even want to use either a physical network connection or a wireless network connection to receive the content when away from home. In particular, the content provider or product manufacturer may find some reluctance by the user to take the time at an airport terminal to connect to a rentable computer system, or to connect to a local wireless network for receiving enhanced digital content. Not only might there be lack of convenience and time in doing so, but also the user may not trust the rentable computer system or the local wireless network to provide content without contamination (e.g., viruses, spy-ware, etc.) Furthermore, and especially with large movie files, there may nevertheless be insufficient bandwidth (or insufficiently reliable network connectivity) to send/receive enhanced content in a relatively short and convenient amount of time.

Accordingly, there are a number of issues that can be addressed when providing a wide range of content to users of portable digital devices.

BRIEF SUMMARY

Implementations of the present invention provide systems, methods, and computer program products configured to provide virtually any type of digital media content to a consumer's digital playback device with relative immediacy. In one implementation, for example, a distributor provides a customer with a flash storage module, which contains media content and one or more playback programs or interfaces. The flash storage module is further configured with a connection interface (e.g., USB, etc.) that is appropriate for the consumer's digital playback device. Upon connecting the storage module, the customer's playback device automatically loads the one or more playback programs and begins playing the media content stored in the storage module. The customer can then listen to (and/or watch) the content as desired.

For example, a storage module can be configured with computerized instructions whereby a method is performed for causing a digital playback device to receive and play back media content. In one implementation, for example, the method can involve receiving identification information about a portable digital playback device upon connection with a storage module. The method can also involve comparing the received identification information with one or more rules or settings stored in the storage module to determine at least one of a method or format for delivering media content on the storage module to the portable digital playback device. In addition, the method can involve preparing one or more sets of execution instructions that include execution information and media content on the storage module to be executed on the portable digital playback device. Furthermore, the method can involve providing the one or more sets of execution instructions from the storage module to the portable digital playback device.

In addition, a vending machine can be configured with computerized instructions to perform a method of distributing media content to the portable digital playback device. In one implementation, the method can involve receiving one or more user selections for media content. The method can also involve receiving one or more user selections regarding an identification of a portable digital playback device. In addition, the method can involve comparing the received one or more selections for media content and playback device identification with one or more locally stored rules or settings to determine at least one of a method or format for delivering the selected content to the identified portable digital playback device. Furthermore, the method can involve providing the selected content to the user using the determined delivery method.

In addition to the foregoing, additional or alternative implementations of the present invention involve business methods for delivering a storage module, such as by a person at a retail store. In one implementation, for example, a method of distributing content to a user having a portable digital playback device can involve identifying a customer at a product location. The method can also involve identifying the presence and type of a digital playback device of the customer. In addition, the method can involve selecting a storage module configured both with a physical interface and a software interface for connecting to and communicating with the digital playback device. Furthermore, the method can involve providing the customer with the selected digital storage module, wherein media content on the selected storage module is immediately played back to the user upon connection with the digital playback device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention relates generally to systems, methods, and computer program products configured to provide virtually any type of digital media content to a consumer's digital playback device with relative immediacy. In one implementation, for example, a distributor provides a customer with a flash storage module, which contains media content and one or more playback programs or interfaces. The flash storage module is further configured with a connection interface (e.g., USB, etc.) that is appropriate for the consumer's digital playback device. Upon connecting the storage module, the customer's playback device automatically loads the one or more playback programs and begins playing the media content stored in the storage module. The customer can then listen to (and/or watch) the content as desired.

Accordingly, and as will be understood more fully herein, a user (e.g., customer) can access and enjoy a wide range of content with relative immediacy, whether traveling, browsing a store for specific media, or even when browsing particular products of interest. For example, a user can obtain one or more storage modules of an entire album, movie, or audio book at a media store, or even at a vending machine or kiosk that sells or rents the storage modules, such as a kiosk at an airport or mall. Similarly or alternatively, a sales person at a retail store may provide the user with a storage module for a particular product of interest. However obtained, the user can then immediately begin enjoying the content on the user's portable digital device.

In one implementation, the digital content can be streamed from a storage module to the user's digital playback device (also referred to as "portable digital playback device," or "playback device"). Thus, in such cases, the user need not worry about whether there is sufficient storage space in the digital playback device. In other cases, the content can be transferred directly to the user's portable digital device, such as in accordance with appropriate digital media protection/rights management rules. In either case, a content provider is able to deliver relatively large, enhanced media content to a user without relying first on conventional network download mechanisms.

Figure 1A:
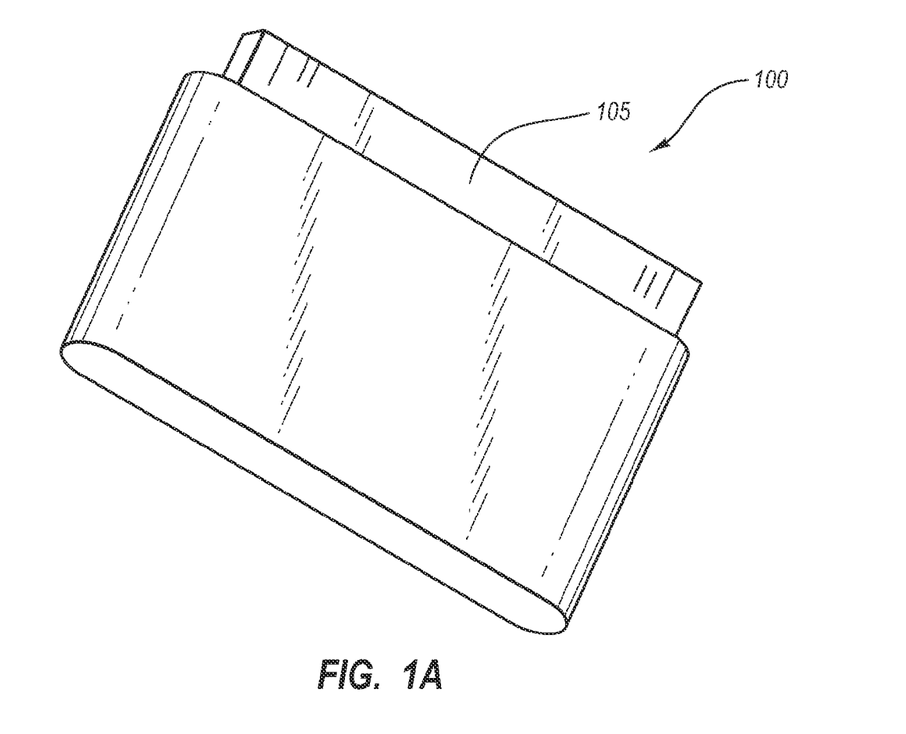
FIG. 1A illustrates a perspective view of a storage component in accordance with an implementation of the present invention configured to deliver digital content to a digital playback device.
Figure 1B:
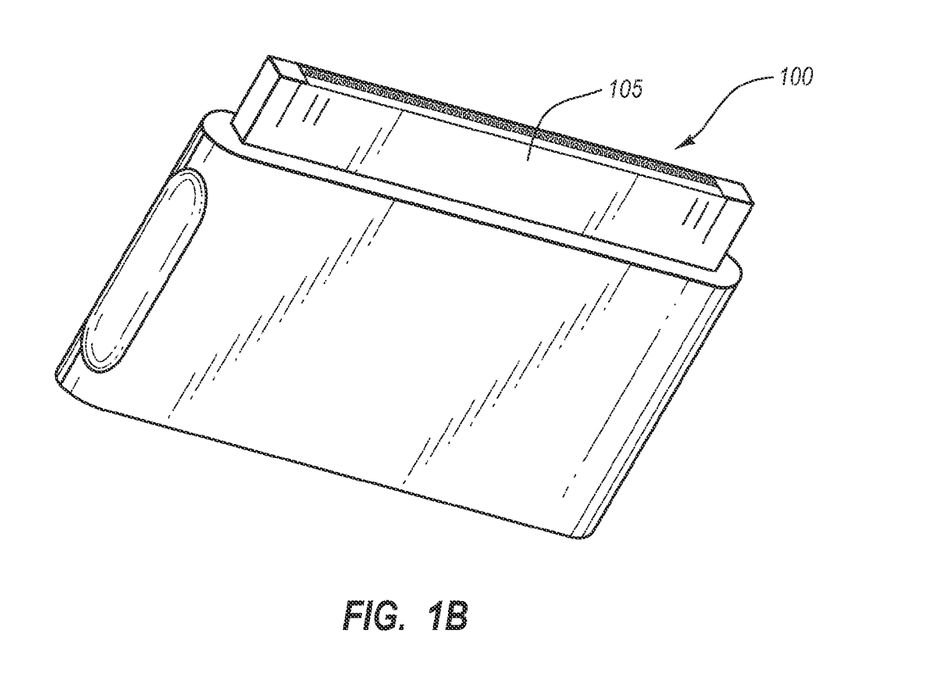
FIG. 1B illustrates another perspective view of the storage component illustrated in FIG. 1A.

Referring now to the Figures, FIG. 1A illustrates a perspective view of one implementation of a storage component that can be used in accordance with an implementation of the present invention. In general, one will appreciate that a storage component/module 100 can be configured both from hardware and software perspectives. For example, FIG. 1A shows that the storage component/module 100 can be configured with a specific electrical connection interface 105. As shown in FIGS. 1A and 1B, the hardware connection interface 105 is approximately the same size as the main body, which contains the storage medium, and such dimensions are appropriate for at least one type of connection to a portable digital playback device, such as an APPLE IPOD device.

Of course, such physical connection dimensions are not required. For example, the physical connection interface 105 and main body can be much more differentially-sized and shaped, depending, for example, on the size of the actual storage medium. In particular, both the physical connection interface 105 and overall dimensions of storage module 100 can be particularly suited for a wide range of digital connection interfaces, some of which can include any format or dimension of Universal Serial Bus ("USB"), IEEE 1394 ("Firewire"), or any other interfaces, including proprietary interfaces. Of course, the specific physical connection interface 105 and dimensions of storage module 100 can also be configured to handle analog content delivery, or handle some combination between analog and digital communication and content delivery with a particular digital playback device.

In any event, the storage module 100 will generally comprise any suitable computer-readable media for storing, delivering, and even in some cases executing computer-executable instructions. For example, the storage module 100 can include any number of storage components, and, in some cases, may also include any number of appropriately-sized processors. With respect to storage, although conventional hard-disk or tape media can be used, the storage module 100 in accordance with the present invention will generally comprise flash storage media for general size considerations.

In particular, flash storage media configured for 100 megabytes ("MB") of digital storage will generally be sufficient in capacity (and sufficiently diminutive in physical size) for most purposes, such as with distributing music albums, or a few video files, such as news-based programs. Of course, a manufacturer may prefer larger or smaller flash media (physical size or digital capacity), as appropriate for particular marketing content, and as appropriate for general use. For example, flash storage media configured for several gigabytes ("GB") or more of digital storage may be needed for some types of movie files based on conventional compression (e.g., mpeg) formats. One will appreciate, however, that flash media can be produced in sizes of only a few megabytes ranging to as high as potentially hundreds of gigabytes, and any such size of flash storage may be appropriate within the context of the present invention.

As such, FIGS. 1A and 1B show that the overall dimensions of at least one particular storage module 100 are such that a user can removably plug the storage module 100 directly into a digital playback device. Upon connection, the storage module 100 and digital playback device (e.g., 250) will automatically begin communicating in order to retrieve or otherwise deliver content from the storage module 100 through the physical connection interface. Accordingly, the storage module 100 can also be configured with a specific software interface (e.g., FIG. 2), and/or one or more software components/modules for interacting with one or more software interfaces in a digital playback device (250, FIG. 2).

In general, the software interface and components/modules can be configured such that the storage module 100 can be recognized by the playback device. The software interface is further configured such that the media player application program on a particular playback device 250 can immediately play specific content stored on the storage module 100. Along these lines, FIG. 2 illustrates a conceptual schematic diagram of a system 200 in which the storage module 100 of FIGS. 1A and 1B delivers media content to a digital playback device 250.

Figure 2:
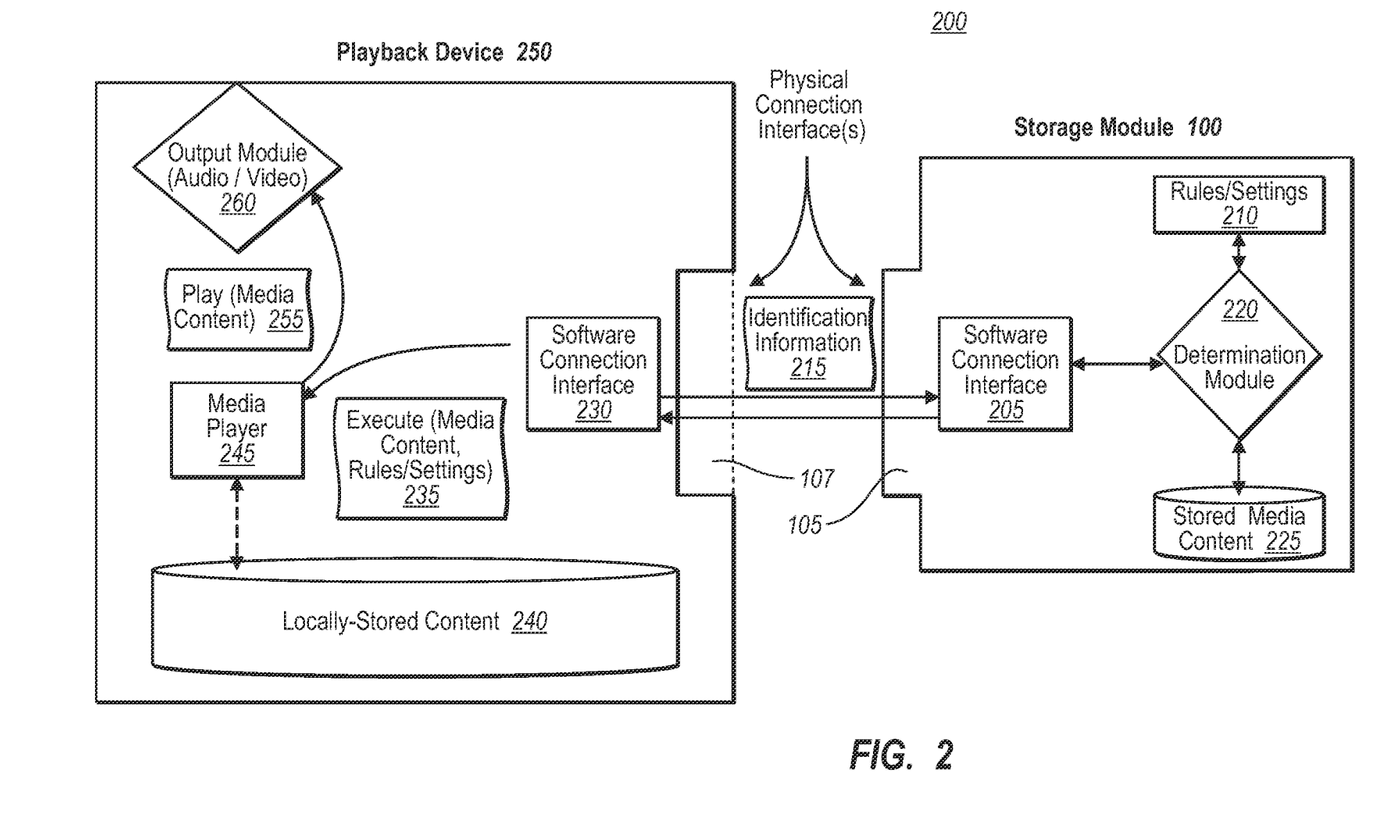
FIG. 2 illustrates an overview schematic diagram of one or more of the software components and modules used in or in conjunction with the storage component of FIGS. 1A and 1B.

In particular, FIG. 2 shows that a playback device 250 comprises one or more physical connection receptacles 107 (e.g., receptacle portion of "physical connection interface"). As previously described, this can be any type or dimension of physical connection interface (e.g., USB, Firewire, or proprietary interface, etc.), and will usually be configured as a reciprocal physical connection interface as presented by storage module 100. For example, FIG. 2 illustrates a system 200 in which playback device 250 comprises a female physical connection interface 107 that corresponds (and is reciprocal) with the male physical connection interface 105 of storage module 100.

In general, the physical connection interfaces 105, 107 can be configured with one or more matching electrical connectors (e.g. via a printed circuit board) that, when connected (i.e. connecting module 100 and device 250), immediately transmit electrical signals to communicate various information about the corresponding playback device 250 or storage module 100. For example, upon connection with the storage module 100, the playback device 250 immediately transmits one or more electrical signals to the storage module 100 via a software connection interface 230. The storage module 100 uses the electrical connection to return one or more electrical signals that allow the playback device 250 to identify the storage module 100, and begin communicating with the storage component's software connection interface 205.

In one implementation, for example, such communication between playback device 250 and storage module 100 can include information regarding required/supported media formats, operating systems, storage size and formats, or the like. In addition, such communication can include available files stored in a media content partition 225, the types of digital media rights rules that are required/supported on each given device, or the like.

Accordingly, FIG. 2 also shows that the storage module 100 can comprise any number of components and modules for ensuring that content is delivered appropriately to the playback device. For example, and in addition to the software connection interface 205, FIG. 2 shows that the storage module 100 comprises "stored media content" 225, a "rules/settings" component 210, and a "determination module" 220. In one implementation, the stored media content 225 comprises one or more media files (e.g., mp2-4, wav, aiff, wma, ra, ram, etc.) that can be streamed or otherwise transferred directly to playback device 250. For example, the stored media content 225 can comprise one or more files of music, audio books, or movie files, which can be geared toward any type of news, entertainment, or simply as targeted ad content.

To make determinations about what format of media file to deliver, which specific media file to deliver, or how to deliver the media file, FIG. 2 shows that the determination module 220 of storage module 200 is in communication with the rules/settings component 210. In general, the rules/settings component 210 comprises basic configuration information, such as operating system information, or other types of rules about how to format or playback certain types of media files based on the detected playback device 250. For example, the rules/settings component 210 can comprise rules regarding what types of files are suited for one type of operating system, or what types of files are best suited for certain types of detected playback devices 250. In addition, the rules/settings component 210 can include certain Digital Rights Management ("DRM") rules, such as one or more rules requiring the media content to be streamed to the playback device 250.

In particular, the rules/settings components 210 can include a wide range of rules under which content should (or is required) to stream, or should (or is required) to be delivered via file transfer. For example, the rules/settings component 210 may comprise rules that identify how much storage is available on playback device 250. Along these lines, the rules settings component can be further configured to allow for file transfers if the available storage space on playback device 250 is sufficiently high, or alternatively require streaming if the available storage at playback device 250 is too low. Similarly, the rules/settings component 210 may include one or more counters (not shown) that only allow certain types of content (e.g., movie files) to be delivered/transferred for a certain amount of time at the playback device, or be delivered/transferred only a certain number of times to the playback device. For example, the rules/settings component 210 can comprise one or more rules that append a time-out function to a transferred media file, so that the media file expires on the playback device 250 after a particular rental period.

Accordingly, when the storage component's 100 software connection interface 205 connects to the software connection interface 230 of the playback device 250, the storage component's 100 software connection interface 205 retrieves and delivers basic identification information 215 of the playback device 250 to the determination module 220. As a preliminary matter, execution of the instructions corresponding to the software connection interface 205, determination module 220, and rules/settings component 210 need not necessarily happen on storage module 100. For example, a manufacturer may prefer not to include physical processors on the storage module for size or cost reasons. Thus, in at least one implementation, the various software components of storage module 100 are first loaded into the playback device 250 (e.g., via RAM), and then executed through the playback device 250.

Thus the FIG. 2 is merely illustrative of one implementation for convenience in description, and it is not required that any given software component be loaded and executed only on a playback device 250 or on a given storage module 100. In any event, FIG. 2 shows that the determination module 220 can compare the retrieved identification information 215 of the playback device 250 with various rules and settings in the rules/settings component 210, and pulls or formats media files in the "stored media content" component, as appropriate. The determination module 220 then sends/retrieves the media content 225 along with processing instructions to the software connection interface 205, which passes the content onward to the appropriate component in playback device 250.

For example, FIG. 2 also shows that the software connection interface 230 at the playback device 250 sends a set of execution instructions to the local playback device's media player 245. The media player 245 can then analyze and process the received instructions as appropriate. In one implementation, for example, the received execution instructions include one or more commands to bypass whatever locally-stored content 240 is being played at the time (if appropriate), and, instead play the stored content 225 from the storage module 100. In additional or alternative implementations, the execution instructions 235 include one or more commands regarding whether to stream content from storage module 100, or to request content that has been retrieved into locally-stored content partition 240.

However configured, FIG. 2 further shows that the media player 245 then executes these instructions 235 (e.g., via one or more processors of the playback device), and sends corresponding output instructions 255 to an output module 260. In general, the output instructions 255 include one or more playback instructions that are uniquely formatted for the playback device's 250 audio driver (not shown), and further include specifically-formatted media content (e.g., from local storage 240 or from storage module). For example, the output instructions can include specifically formatted machine language commands that direct one or more output processors of an audio and/or video processor to process the content (obtained from or via storage module 100).

Accordingly, one will appreciate, therefore, that there are a wide range of ways in which the storage module 100 can be configured and used within the scope of the present invention. With respect to advertising content, for example, an auto dealer or manufacturer may create a wide range of storage modules 100 having stored thereon specific ad/marketing content for each car it creates, or only for certain cars, etc. Along these lines, the dealer or manufacturer could create a single or few storage modules 100 that have all or most of the different ad/marketing content per car, and the user could ultimately select the content of interest.

In either case, the auto dealer can then deliver/provide the storage modules to its individual dealerships, along with its delivery of the actual automobiles. When potential customers (e.g., end-user) come to the auto lot to browse the vehicles, the customers can select a specific storage module 100 from a collection. Alternatively, a sales representative might simply hand out specific storage modules 100 to the customers, and may discriminate which storage modules 100 are delivered based on the types of questions asked by the potential customer. Such questions might be directed to differentiate storage modules 100 equipped with certain media files for certain cars, or to determine an appropriate physical connection interface 105 that is suited to a user's playback device 250 interface 107.

Of course, this example with particular respect to the automobile industry is merely one way in which implementations of the present invention can be used and/or practiced. In particular, one will appreciate that other types of product manufacturers may benefit from these principles. For example, a clothing or grocery retail store might also provide the storage modules with specific information about special promotions for the day or year, or with specific advertising content received from product manufacturers. The clothing or grocery store chain could even charge royalties to the product manufacturers in order to place their advertising content on the storage modules. The clothing or grocery store chain could further add one or more magnetic keys that do not allow the storage modules to be taken off premises without sounding an alarm.

With respect to general media content distribution, a distribution outlet could be set up to sell or otherwise rent storage modules 100, or to allow limited downloads from a public/common flash module connector. For example, a distributor of media content, whether in a large multi-media store, or at a small newspaper stand in an airport, could provide storage modules 100 that contain a number of different new release movies, music albums, or daily content downloads from a national news source, such as Fox News, CNN, MSNBC, or even a local news source.

Figure 3:
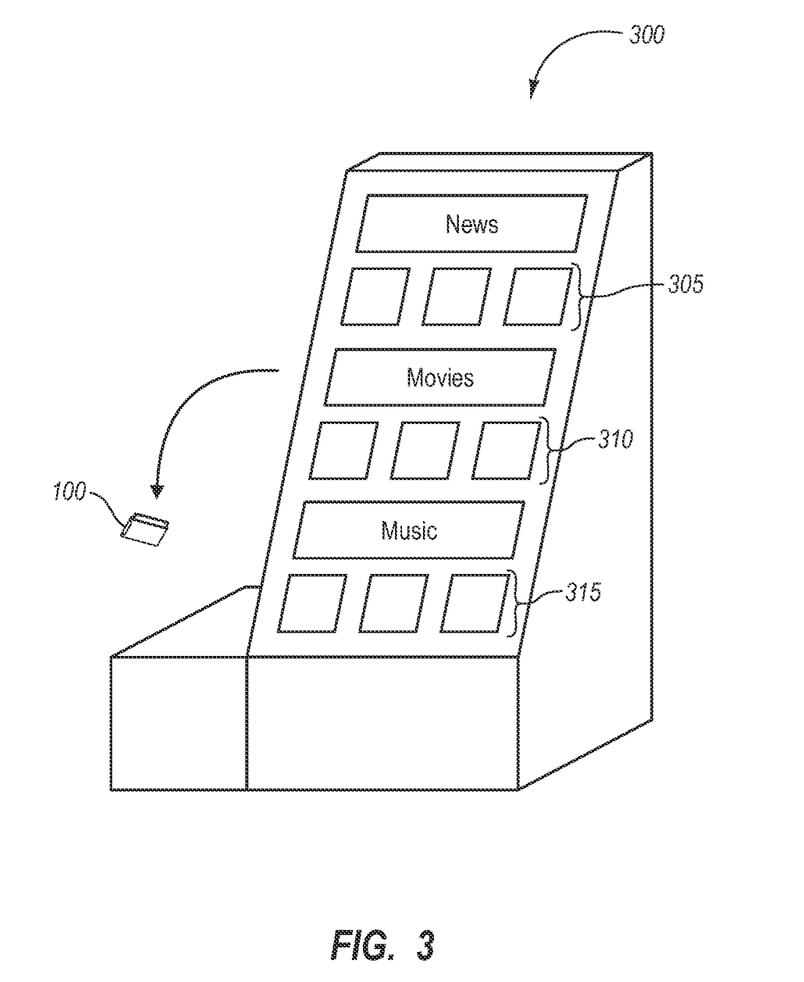
FIG. 3 illustrates a conceptual schematic diagram in accordance with an implementation of the present invention of a vending machine/kiosk apparatus for delivering a flash storage module comprising a wide range of media content.

In one implementation, the distributor could even provide one or more publicly accessible physical connectors 105 that are connected to a storage device of particular content in a vending machine or kiosk (e.g., 300, FIG. 3). In such a case, any user paying a particular fee could attach their portable playback device 250 to the physical connection interface 105 and download certain specified content. Accordingly, it is not required that the storage module 100 itself be portable.

As previously mentioned, the delivered content 225 could be configured with a number of different types of timeout features due to a rules/settings component 210 that can be based on the purchase price. For example, a user could pay a lower fee to rent media content 225 for a short duration. In one implementation, the distributor could encode this information directly into the rules settings of a storage component 100 before delivery, and further limit usage to the specific playback device 250 based on a device identifier. In such cases, the rules/settings component 210 could be encoded by the distributor to automatically invalidate or delete the content 225 after a preset number of uses, or after an expiration of a particular time interval. By the same token, the user could also pay a larger fee to access the content on more of an ownership basis.

In the case of renting content, the storage modules 100 can be provided as a rented device that is returned to another location also owned by the same distributor. For example, and as previously mentioned, a user may be able to buy/rent a storage module 100 of news broadcasts, movies, or music albums through an airport distributor in one city, and then deposit the storage module 100 at another location owned by the distributor in another airport of another city. In such a case, the distributor could sell or rent the storage module of content using a credit card deposit system, in which the distributor charges a much larger fee than the rental fee to the user if the user fails to return the storage module 100 in an appropriate amount of time, or at all.

As such, and further along these lines, implementations of the present invention further include one or more apparatus for selling or renting storage modules 100 of media content. As shown in FIG. 3, for example, one implementation of the present invention includes a vending machine/kiosk 300 that is configured to sell various media content, such as various news programs (e.g., 305), and music (e.g., 310) or movie-based (e.g., 315) storage modules. In particular, the vending machine 300 can include various pre-packaged storage modules 100 that, when appropriately purchased, are released into a holding bin for user access. For example, the user can approach the vending machine 300, select a news button 305, a movie button 310, or a music button 315, further select within these or other interface buttons a particular artist or program (e.g., via a computerized user interface), and further select one or more options for physical connection interface 105/107.

Upon purchase and receipt, therefore, the vending machine 300 can encode the rules/settings component 210 for a particular storage module 100 based on the usage fee, or alternatively provide the user with a storage module 100 that is already configured with rules/settings for a prescribed usage fee. The user can then obtain the storage module 100 (e.g., from a drop bin) and insert the storage module 100 directly into the portable playback device 250.

The vending machine of FIG. 3 could further include one or more receptacles for receiving storage module 100 returns, such as if the user is finished renting a particular storage module 100, or if the user purchased the wrong module and desires to return it. One or more components within the vending machine 300 could then read Radio Frequency Identification ("RFID") information, read a magnetic strip, or otherwise read encoded information on the storage module 100 to identify what has been returned, and then send a corresponding signal to a database storing an account for the user. The illustrated vending machine 300, however, is simply one way of distributing a physical storage module 100 (or media content 225) to a user, and there can be many mechanisms, methods, and apparatus for distributing media content for use with a portable playback device 250 within the general principles of the present invention.

Figure 5:
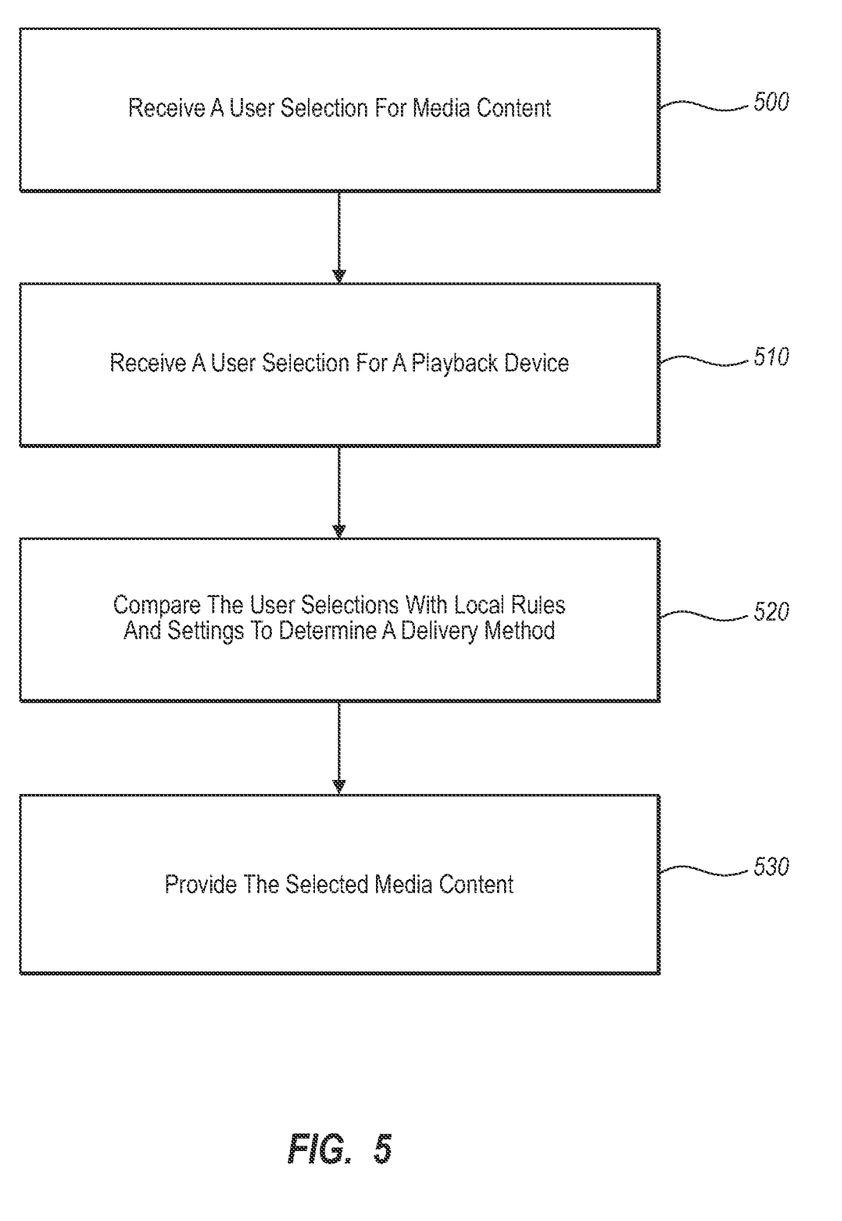
FIG. 5 illustrates a flowchart of a sequence of acts in a method executed at a vending machine/kiosk for delivering content to a playback device in accordance with an implementation of the present invention.
Figure 6:
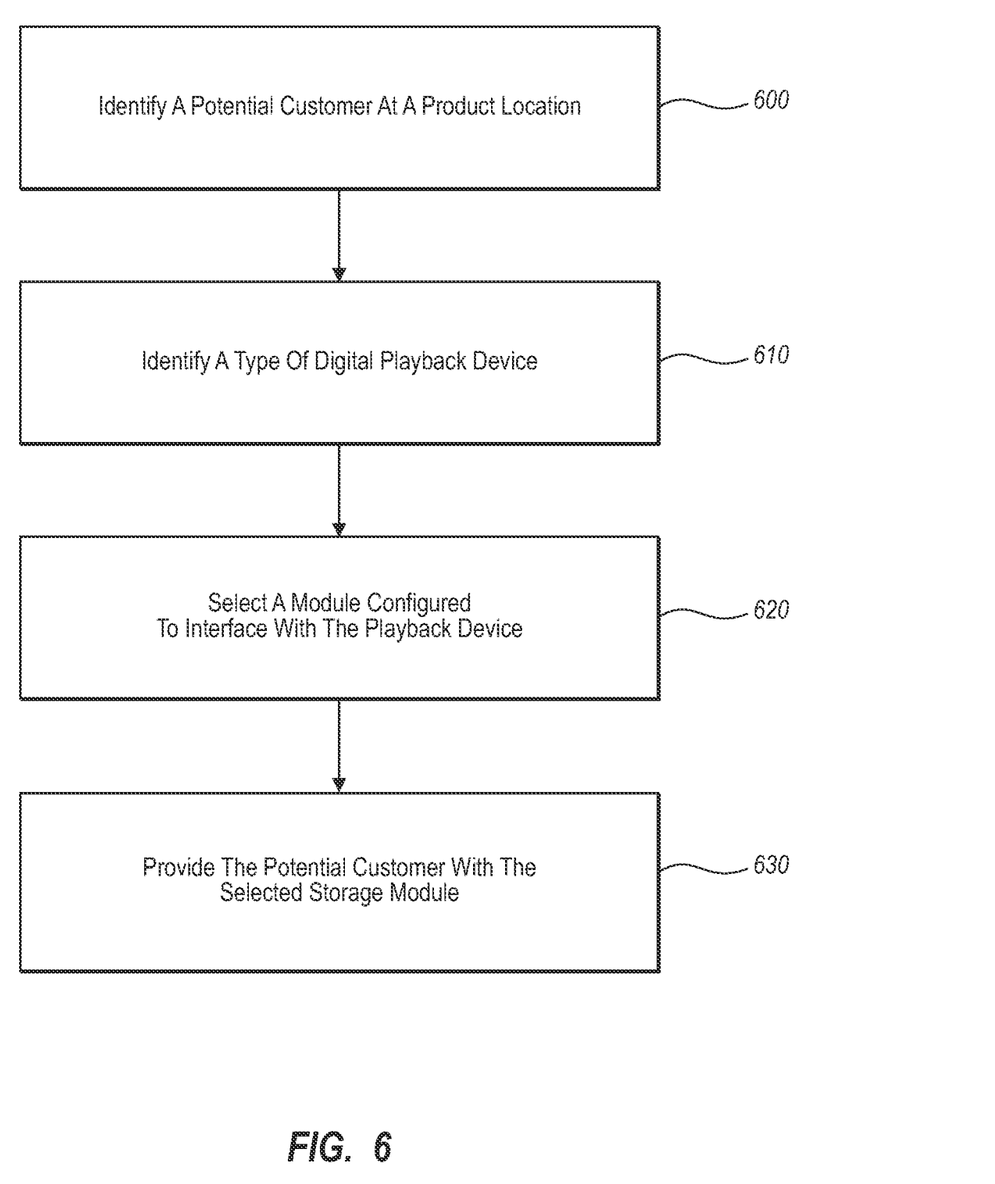
FIG. 6 illustrates a flowchart of a sequence of acts in a business method for providing one or more storage modules of specific content to a user in accordance with an implementation of the present invention.

In addition to the foregoing, implementations of the present invention can also be described in terms of flowcharts of methods comprising one or more acts for accomplishing a particular result. For example, FIG. 4 illustrates a method from the perspective of executing storage module 100 instructions (e.g., FIG. 2), while FIG. 5 illustrates a method from the perspective of a vending machine or kiosk (e.g., FIG. 3), and FIG. 6 illustrates a method from the perspective of operations at a retail store or point of sale.

Figure 4:
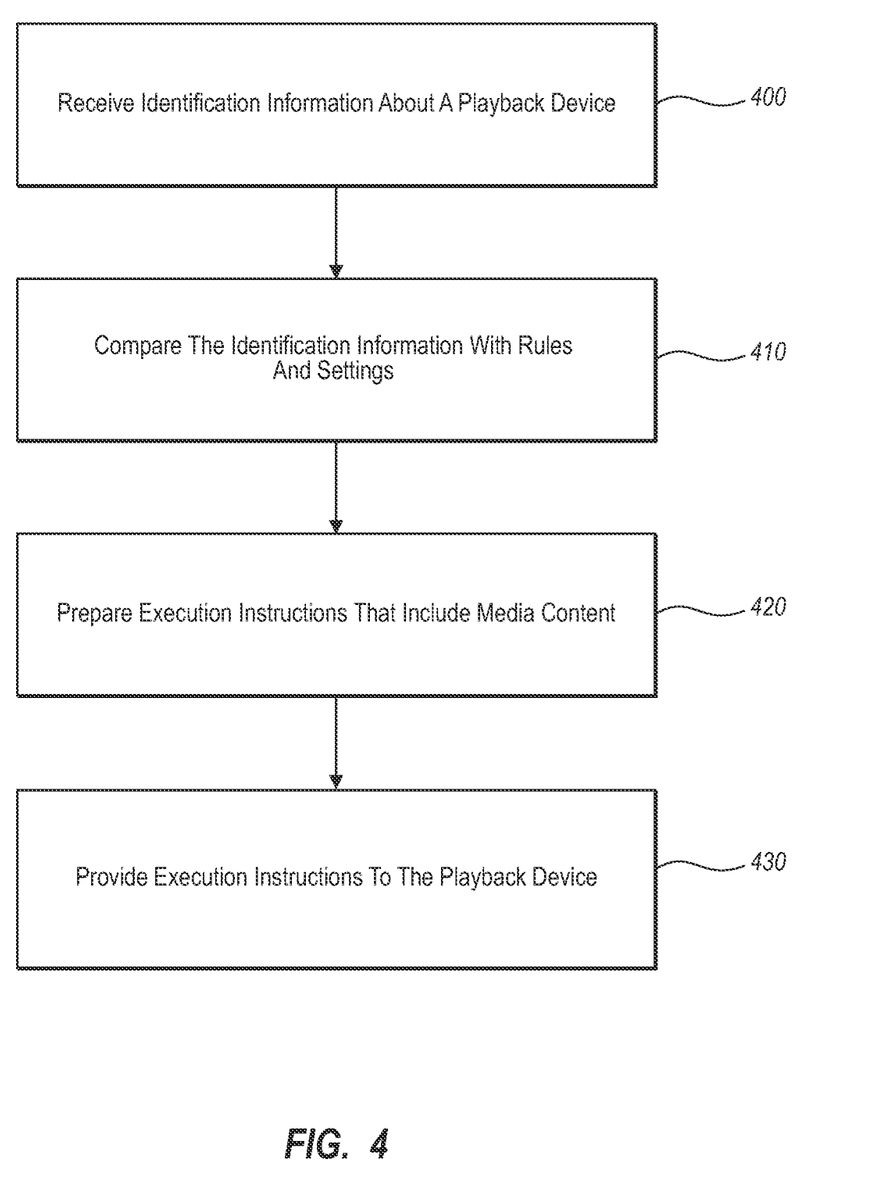
FIG. 4 illustrates a flowchart of a sequence of acts in a method executed on a storage module or a playback device for delivering content to a playback device in accordance with an implementation of the present invention.

For example, FIG. 4 shows that a method in accordance with an implementation of the present invention of causing a portable digital playback device to receive and play back media content from a storage module can comprise an act 400 of receiving identification information about a playback device. Act 400 includes receiving identification information about a portable digital playback device upon connection with a storage module. For example, upon connection with playback device 250, software connection interface 205 and determination module 220 can be begin execution, whether on processors on storage module 100 or on playback device 250 after being loaded into RAM. The software connection interface 205 and determination module 220 can then identify various identification information 215 about the playback device 250, such as the type of playback device 250, a device identifier, operating system information, storage capacity, and the like.

FIG. 4 also shows that the method can comprise an act 410 of comparing the identification information with rules and settings. Act 410 includes comparing the received identification information with one or more rules or settings stored in the storage module to determine at least one of a method or format for delivering media content on the storage module to the portable digital playback device. For example, determination module 220 compares the identification information 215 of playback device 250 with one or more rules or settings 210 to identify the format of acceptable media files, whether to stream or transfer media files, timing functions for media files, and the like.

In addition, FIG. 4 shows that the method can comprise an act 420 of preparing execution instructions that include media content Act 420 includes preparing one or more sets of execution instructions that include execution information and media content on the storage module to be executed on the portable digital playback device. For example, determination module 220 prepares one or more messages to be sent to playback device, which are to be executed at playback device. These messages can include the media content 225 in storage module 100, as well as instructions/commands that cause playback device 250 to receive and load the media content 225 from storage module 100.

Furthermore, FIG. 4 shows that the method can comprise an act 430 of providing the execution instructions to the playback device. Act 430 includes providing the one or more sets of execution instructions from the storage module to the portable digital playback device. For example, FIG. 2 shows that determination module, via software connection interface 205, sends specifically formatted (e.g., for the type of playback device 250 and/or operating system thereon) execution instructions 235 to playback device 250. These execution instructions 235 can then be loaded into the playback device 250 media player 245, and correspondingly output through output module 260.

In addition to the foregoing, FIG. 5 shows that a method from the perspective of a vending machine or kiosk 300 of distributing media content to a portable digital playback device can comprise an act 500 of receiving one or more user selections for media content. For example, a user approaches a vending machine/kiosk 300 at a point of sale location, such as at an airport terminal, and enters a selection for music, audio books, movies, news content, or the like. The vending machine/kiosk 300 can be configured so that the user is hitting various physical buttons, entering input into a graphical user interface, or any combination thereof.

FIG. 5 also shows that the method can comprise an act 510 of receiving a user selection for a playback device. Act 510 includes receiving one or more user selections regarding an identification of a portable digital playback device. For example, the user enters (and the vending machine 300 receives) one or more selections regarding the type of digital playback device, such as whether the device is an APPLE IPOD device, a MICROSOFT ZUNE device, or a host of other generic USB-interfacing media devices. In some cases, the user may even enter in other information (e.g., if the device is not a well-known brand) such as the type of supported media files, or other device identification information. In still other cases, the user may not even enter this information at all, and this information may be automatically identified by plugging the user's playback device 250 directly into a physical connection interface (e.g., akin to interface 105) presented at the vending machine/kiosk 300.

In addition, FIG. 5 shows that the method can comprise an act 520 of comparing the user selections with local rules and settings to determine a delivery method. Act 520 includes comparing the received one or more selections for media content and playback device identification with one or more locally stored rules or settings to determine at least one of a method or format for delivering the selected content to the identified portable digital playback device. For example, the vending machine/kiosk 300 can use the identification information 215 received from the user (or directly from playback device 250) to identify storage modules with supported physical connection interfaces, as well as those with supported media files and software connection interfaces. The vending machine/kiosk 300 can also determine if media content is to be streamed to the playback device 250, transferred from a storage module to the playback device, or even transferred to the playback device 250 directly from the vending machine/kiosk 300.

Furthermore, FIG. 5 shows that the method from the perspective of the vending machine/kiosk 300 can comprise an act 530 of providing the selected media content. Act 300 includes providing the selected content to the user using the determined delivery method. For example, the vending machine/kiosk 300 delivers a specifically formatted storage module 100 through a reception bin, or, alternatively transfers the selected media content directly into a physically connected playback device 250.

FIG. 6 illustrates yet another or alternative business method for providing content to a user in accordance with one or more implementations of the present invention. In particular, FIG. 6 shows that a method for distributing, such as via one or more agents at a point of sale—or other promoters of various media or promotional content—to a user that has a portable digital playback device can comprise an act 600 of identifying a customer at a product location. For example, an agent at a point of sale identifies a customer that is interested in purchasing a product, or otherwise identifies a person for which the agent would like to provide various promotional content. The agent may then determine to provide content associated with the product (e.g., advertisements of the product, or the product itself in the case of movies, books, or music).

FIG. 6 also shows that the method can comprise an act 610 of identifying a type of digital playback device. Act 610 includes identifying the presence and type of a digital playback device of the customer. For example, the sales agent inquires of available playback devices 250 that may be used by the user, or alternatively identifies (e.g., with or without interaction with the user) a playback device 250 being carried and currently used by the user.

In addition, FIG. 6 shows that the method can comprise an act 620 of selecting a storage module configured to interface with the playback device. Act 620 includes selecting a storage module configured both with a physical interface and a software interface for connecting to and communicating with the digital playback device. For example, the sales agent identifies user-selected media content formatted for an APPLE IPOD playback device, and further identifies a storage module 100 that has both a physical and software configuration for the device.

Furthermore, FIG. 6 shows that the method can comprise an act 630 of providing the potential customer with the selected storage module. Act 600 includes providing the customer with the selected digital storage module, wherein media content on the selected storage module is immediately played back to the user upon connection with the digital playback device. For example, the sales agent provides the storage module 100 directly to the potential customer in a sales transaction, or alternatively provides the storage module 100 on a limited, on-site use basis. The user can then immediately connect the storage module and begin playing back the content.

Accordingly, FIGS. 1A through 6 provide a number of different or alternative implementations for providing various forms of content to users of portable digital media players on a relatively immediate basis. In particular, implementations of the present invention provide one or more mechanisms for ensuring that specific content can be distributed to an end user's playback device without the otherwise cumbersome techniques of first downloading content through an intermediate computer system (e.g., home system, laptop, or PDA) or network connection. Of course, one will appreciate that implementations of the present invention can be applied to a wide range of content (and methods of distribution) and are thus not limited to distribution of marketing messages, music albums, movies, audio books, news programs, or the like.

For example, a seminar host, trainer, or personal trainer, whether in a professional development environment or even in a physical fitness environment, could provide training content on or through the storage module. For example, an attendee, or trainee attending a training environment, could receive a storage module with training content upon entrance into the training site. The attendee/trainee could then directly plug in the storage module 100 into the playback device 250, and thus hear and/or watch specific training content or messages (rather than, or in addition to, any marketing messages).

Along similar lines, one user (e.g., friend, personal trainer, etc.) could encode a previously purchased storage module 100 with a set of audio and/or video files, as well as a user-defined play list, such as part of the rules in the rules/settings component 210. For example, a friend desires to provide a particular mix of certain media files, and desires another to receive those media (audio and/or video) files in a particular order. Similarly, a personal trainer might encode a storage module 100 with a series of media files and a corresponding set of one or more play lists as part of a workout routine. The one user could then provide the newly encoded storage module 100 to another user (e.g., friend, trainee, etc.) who, upon connecting the storage module 100 to a portable digital playback device 250, could then immediately begin enjoying the particularly tailored media content.

Of course, in this or any of the other implementations described herein, it is not necessarily required that the portable digital playback device 250 immediately begin playing back the media content 225 encoded on a particular storage module 100. For example, the execution information (e.g., 235) provided by determination module 220 could include one or more user interface options (not shown) that are particularly tailored to the operating system of the particular portable digital playback device 250. In such a case, plugging in the storage module 100 to the playback device 250 could immediately initiate a user interface on a video screen for the playback device 250. The user interface could be configured to provide a number of options that enable the user to begin playing media content 225, pause media content 225, stop playback of media content 225, select various chapters, audio files, events, or segments of media content 225, or the like.

Furthermore, and in addition to different types of content (or modes of distribution), implementations of the present invention can also be used to distribute content (marketing or otherwise) not just to a portable playback device, but also from a portable playback device (or directly from a storage module) to a user's personal computer. For example, when the portable media device is connected to the user's computer, it is understood that some playback devices are configured to automatically synchronize content that may be stored on the playback device with content at the end-user's personal computer. Thus, in implementations where the content is not just played from the storage module, but also copied to a storage partition in the playback device itself, the content could be transferred back to the computer, consistent with the "synching" functionality of the playback device/personal computer.

As previously discussed herein, implementations of the present invention can be configured with any number or type of appropriate Digital Rights Management (DRM) software/rules. In some implementations, for example, the end-user's DRM policies could be used to block transfers of protected content from the storage component to the playback device, from the playback device to the personal computer, from the storage component to the personal computer, and vice versa, as appropriate.

The embodiments of the present invention may also comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computer-implemented method of causing a portable digital playback device to receive and play back digital media content stored on a portable computer storage device, the computer-implemented method comprising acts of:

at the portable computer storage device, receiving identification information for a type of operating system used at a portable digital playback device when the portable digital playback device is connected to the portable computer storage device;

determining at the portable computer storage device, based on the type of operating system identified, a required format for digital media content stored in memory on the portable computer storage device;

accessing rules and settings stored at the portable computer storage device, and then determining other rules and settings for managing playback conditions at the portable digital playback device; and sending from the portable computer storage device instruction for formatting the digital media content for playback on the portable digital playback device in accordance with the determined format, and sending from the portable computer storage device instructions for the determined other applicable rules and settings for managing playback at the portable digital playback device.

2. The method as recited in claim 1, wherein the other applicable rules and settings for managing playback conditions at the portable digital playback device comprise identifying how much storage is available at said portable digital playback device and then either allowing transfer of one or more files for the digital media content to the portable digital playback device, or if insufficient storage at the portable digital playback device is identified, then streaming the digital media content to the portable digital playback device.

3. The method as recited in claim 1, wherein the other applicable rules and settings for managing playback conditions at the portable digital playback device comprise limiting the amount of time the digital media content can be played back at the portable digital playback device.

4. The method as recited in claim 1, wherein the other applicable rules and settings for managing playback conditions at the portable digital playback device comprise limiting the number of times the digital media content can be played at the portable digital playback device.

5. The method as recited in claim 4, wherein the other applicable rules and settings for managing playback conditions at the portable digital playback device comprise limiting the number of times the digital media content can be played back for only certain types of digital media content.

6. The method as recited in claim 3, wherein limiting the amount of time the digital media content can be played back at the portable digital playback device is based on a usage fee received from a user of the portable digital playback device.

7. The method as recited in claim 3, wherein the other applicable rules and settings for managing playback conditions at the portable digital playback device comprise limiting the amount of time the digital media content can be played back at the portable digital playback device for only certain kinds of digital media content.

8. The method as recited in claim 4, wherein limiting the number of times the digital media content can be played back at the portable digital playback device is based on a usage fee received from a user of the portable digital playback device.

9. A portable computer storage device comprising:
one or more processors;
memory storing one or more types of digital media content;
the memory coupled to the one or more processors containing instructions being executed to perform the following at the portable computer storage device:
receiving identification information for a type of operating system used at a portable digital playback device when the portable digital playback device is connected to the portable computer storage device;
determining, based on the type of operating system identified, a required format for digital media content stored in memory on the portable computer storage device;
accessing rules and settings stored at the portable storage device, the rules and settings managing playback conditions at the portable digital playback device; and
sending the formatted digital media content for playback on the portable digital playback device in accordance with the determined format and other applicable rules and settings as determined.

10. The system as recited in claim 9, wherein the portable computer storage device comprises a flash memory device.

11. The system as recited in claim 9, wherein the other applicable rules and settings for managing playback conditions at the portable digital playback device comprise identifying how much storage is available at said portable digital playback device and then either allowing transfer of one or more files for the digital media content to the portable digital playback device, or if insufficient storage at the portable digital playback device is identified, then streaming the digital media content to the portable digital playback device.

12. The system as recited in claim 9, wherein the other applicable rules and settings for managing playback conditions at the portable digital playback device comprise limiting the amount of time the digital media content can be played back at the portable digital playback device.

13. The system as recited in claim 12, wherein the other applicable rules and settings for managing playback conditions at the portable digital playback device comprise limiting the amount of time the digital media content can be played back at the portable digital playback device for only certain kinds of digital media content.

14. The system as recited in claim 13, wherein limiting the amount of time the digital media content can be played back at the portable digital playback device is based on a usage fee received from a user of the portable digital playback device.

15. The system as recited in claim 9, wherein the other applicable rules and settings for managing playback conditions at the portable digital playback device comprise limiting the number of times the digital media content can be played at the portable digital playback device.

16. The system as recited in claim 15, wherein the other applicable rules and setting for managing playback conditions at the portable digital playback device comprise limiting the number of times the digital media content can be played back for only certain types of digital media content.

17. The system as recited in claim 16, wherein limiting the number of times the digital media content can be played back at the portable digital playback device is based on a usage fee received from a user of the portable digital playback device.

18. The system as recited in claim 9, wherein the memory storing the one or more types of digital content media is non-volatile.

19. The system as recited in claim 9, wherein the one or more processors include RAM or ROM memory containing said executable instructions.

* * * * *